US008071254B2

(12) United States Patent
Yang

(10) Patent No.: US 8,071,254 B2
(45) Date of Patent: Dec. 6, 2011

(54) CROSSLINKABLE FLUOROPOLYMER, CROSSLINKED FLUOROPOLYMERS AND CROSSLINKED FLUOROPOLYMER MEMBRANES

(75) Inventor: Zhen-Yu Yang, Hockessin, DE (US); Amy Qi Han, legal representative, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 113 days.

(21) Appl. No.: 12/344,881

(22) Filed: Dec. 29, 2008

(65) Prior Publication Data
US 2009/0182066 A1 Jul. 16, 2009

Related U.S. Application Data

(60) Provisional application No. 61/016,964, filed on Dec. 27, 2007.

(51) Int. Cl.
*C08F 214/18* (2006.01)
*C08F 218/26* (2006.01)
*H01M 8/10* (2006.01)
*H01M 8/80* (2006.01)
*C08J 5/20* (2006.01)

(52) U.S. Cl. ............ 429/494; 521/27; 521/38; 526/242; 526/243; 526/249

(58) Field of Classification Search .................... 521/27, 521/33, 38; 522/117, 121, 125; 526/243, 526/242, 249; 429/494
See application file for complete search history.

(56) References Cited

U.S. PATENT DOCUMENTS

| 3,282,875 | A | 11/1966 | Connolly et al. |
| 3,664,915 | A | 5/1972 | Gore |
| 3,953,566 | A | 4/1976 | Gore |
| 3,962,153 | A | 6/1976 | Gore |
| 4,187,390 | A | 2/1980 | Gore |
| 4,358,545 | A | 11/1982 | Ezzell et al. |
| 5,463,005 | A * | 10/1995 | Desmarteau ................... 526/240 |
| 5,547,551 | A | 8/1996 | Bahar et al. |
| 6,110,333 | A | 8/2000 | Spethmann et al. |
| 6,214,955 | B1 | 4/2001 | Yang |
| 6,252,000 | B1 * | 6/2001 | O'Brien ........................ 525/199 |
| 6,255,543 | B1 | 7/2001 | Yang |
| 6,300,445 | B1 | 10/2001 | Hung et al. |
| 6,365,693 | B1 | 4/2002 | Hung |
| 6,417,379 | B1 | 7/2002 | Hung |
| 6,939,581 | B2 * | 9/2005 | Sanguineti et al. ......... 427/385.5 |
| 7,153,802 | B2 * | 12/2006 | Manco et al. ................. 502/101 |
| 7,399,791 | B2 * | 7/2008 | Arcella et al. .................. 521/27 |
| 7,713,629 | B2 * | 5/2010 | Schlenoff ..................... 428/421 |
| 2004/0039142 | A1 * | 2/2004 | Yang ............................. 526/240 |
| 2006/0014067 | A1 * | 1/2006 | Hedhli et al. ................... 429/33 |

FOREIGN PATENT DOCUMENTS

| EP | 1167400 A1 | 1/2002 |
| EP | 1172382 B1 | 11/2005 |
| WO | 0077057 A2 | 12/2000 |

OTHER PUBLICATIONS

Shi-Zheng Zhu, Synthesis of Fluoroalkanesulfonyl Azides and their Reactions as Fluoroalkanesulfonyl nitrene Precursors, Tetrahedron Letters, vol. 33, No. 43, pp. 6503-6504, 1992, Printed in Great Britain.

Yoshitsugu Sone et al., Proton Conductivity of Nafion 117 as Measured by a Four-Electrode AC Impedance Method, Journal of Electrochemical Society, vol. 143, No. 4, Apr. 1996.

* cited by examiner

*Primary Examiner* — Susan W Berman

(57) ABSTRACT

Crosslinkable polymers and crosslinked fluoropolymers are prepared from selected fluorinated dienes and monomers containing Br and I. Also disclosed are proton conductive membranes of these crosslinked fluoropolymers.

11 Claims, No Drawings

CROSSLINKABLE FLUOROPOLYMER, CROSSLINKED FLUOROPOLYMERS AND CROSSLINKED FLUOROPOLYMER MEMBRANES

FIELD

Disclosed are crosslinked fluoropolymer ionic polymers made from selected bromine and iodine containing monomers. Also disclosed are membranes made from these crosslinked polymers.

BACKGROUND

It has long been known in the art to form ionically conducting polymer electrolyte membranes and gels from organic polymers containing ionic pendant groups. Well-known so-called ionomer membranes in widespread commercial use are Nafion® perfluoroionomer membranes available from E. I. du Pont de Nemours and Company, Wilmington, Del. Nafion® is formed by copolymerizing tetrafluoroethylene (TFE) with perfluoro(3,6-dioxa-4-methyl-7-octenesulfonyl fluoride), as disclosed in U.S. Pat. No. 3,282,875. Other well-known perfluoroionomer membranes are composed of copolymers of TFE with perfluoro (3-oxa-4-pentene sulfonyl fluoride), as disclosed in U.S. Pat. No. 4,358,545. The copolymers so formed are converted to the ionomeric form by hydrolysis, typically by exposure to an appropriate aqueous base, as disclosed in U.S. Pat. No. 3,282,875. Lithium, sodium and potassium are all well known in the art as suitable cations for the above cited ionomers.

It is known that membrane conductivity can be improved by reducing the equivalent weight of the polymer comprising the membrane. However, reducing equivalent weight to obtain high conductivity gives rise to problems with poor mechanical properties in proton conductive membranes. One approach to improve mechanical properties is to prepare crosslinked ionomers. Crosslinked terpolymers of TFE, perfluorovinyl ethers containing sulfonyl fluoride, and fluorinated dienes are disclosed in European patent EP 1172382. Various crosslinkers are disclosed in European patent EP 1167400 and U.S. Pat. Nos. 6,214,955 and 6,255,543 disclose polymers containing cyclic repeating units of selected partially fluorinated monomers.

What is needed, are new crosslinked polymers that can be formed into conductive proton conductive membranes with good mechanical properties.

SUMMARY

Disclosed herein is a crosslinkable polymer as shown in the following formula:

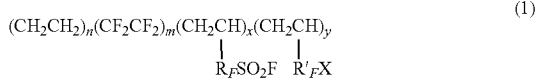
(1)

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms;

n, m, x and y are the number of repeating units of the monomers; and

X is Br or I.

Also disclosed is a crosslinkable polymer as shown in the following formula:

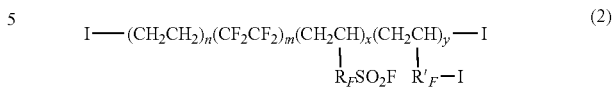
(2)

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms; and n, m, x and y are the number of repeating units of the monomers.

Also disclosed is a crosslinked polymer of formula 1 formed by reaction of the X groups in the presence of a coagent comprised of a triene and a free radical initiator.

Also disclosed is a crosslinked polymer of formula (4) formed by reaction of the Iodine (I) groups in the presence of a triene coagent and a free radical initiator.

Also disclosed is a proton conductive membrane containing $R_F SO_3 M$ groups formed by the hydrolysis of $R_F SO_2 F$ groups of the crosslinked polymers formed by crosslinking of the crosslinkable polymers of formulae (1) or (4); wherein M is independently H, an alkali cation, ammonium or substituted ammonium groups.

Also disclosed is an electrochemical cell comprising the proton conductive membrane formed from the crosslinked polymers of formulae (1) or (4). Also disclosed are fuel cells.

Also disclosed are processes to prepare the crosslinkable polymers of formula (1) or (4) and their hydrolyzed crosslinked polymers. Also disclosed are processes to prepare proton conductive membranes from the crosslinkable polymers selected from formulae (1), (2), (3) and (4).

Although not wishing to be bound by theory, it is believed that the crosslinks form via reaction of the pendant $R'_F$—X groups with each other or any radical comprising abstractable H or I groups.

DETAILED DESCRIPTION

Disclosed herein are crosslinkable polymers and their crosslinked polymers that are useful in making proton-conductive membranes for electrochemical cells such as fuel cells and can be used in any application wherein proton conductive capacity is desired. The proton conductive membranes may also be used as electrolytes, electrode binders, sensors, electrolysis cells, in lithium batteries in lithium salt form, and in any application requiring charge-transfer phenomena, such as components of light-emitting displays. The crosslinkable polymers described herein can be interpolymers.

As defined herein "alkyl" means a monovalent group containing only carbon and hydrogen, chiral or achiral, connected by single bonds and/or by ether linkages, and substituted accordingly with hydrogen atoms. It can be linear, branched, or cyclic.

As defined herein "optionally fluorinated" means that one or more of the hydrogens can be replaced with fluorines.

As defined herein the term "interpolymer" is intended to include oligomers and polymers having different repeating units. The term "copolymer" means polymers having two or more different repeating units. The term "terpolymer" means polymers having three or more different repeating units. The term "tetrapolymer" is intended to include oligomers and copolymers having four or more different repeating units. A tetrapolymer derived from monomers A, B, C and D has repeating units (-A-), (-B-), (-C-) and (-D-). The interpolymers described herein can have repeating units distributed in a random or block manner.

As defined herein "crosslinking" is the attachment of a polymer chain with another or the same chain. In general high crosslinking results in insolubility in a particular solvent. The selection of polymer molecular weight, polymer and copolymer composition, and a solvent is within the purview of one skilled in the art. As the total number of crosslinks increase the molecular weight of the polymer increases. The increase in molecular weight is generally expected to result in a reduced solubility of the polymer in a particular solvent. The amount of crosslinking can be adjusted by the selection of the amount of halogen (Br and/or I) containing groups. Crosslinking may be initiated by heating. The crosslinking may also be initiated by ultraviolet radiation, gamma ray radiation, electron beam radiation and heavy ion radiation resulting to cause the formation of crosslinks. A combination of heating and radiation can also be used to cause crosslinking.

As defined herein a "triene" is a compound containing three non-conjugated double bonds.

As defined herein the term "membrane", a term of art in common use in electrochemistry, is synonymous with the terms "film" or "sheet", which are terms of art in more general usage, but refer to the same articles. Membrane can include proton conductive membranes and may or may not be crosslinked. The crosslinking can be performed while the proton conductive membrane is absorbed on or in a porous support.

Disclosed are crosslinkable polymers containing the repeating units $(CH_2CH_2)_n$, $(CF_2CF_2)_m$, $(CH_2C(R_FSO_2F)H)_x$, and $\{CH_2CH(R'_FX)\}_y$. Such crosslinkable polymers are shown below in formula (1).

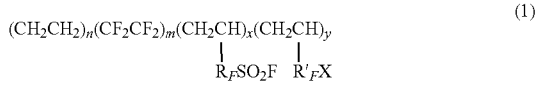

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms;

n, m, x and y are the number of repeating units of the monomers; and

X is Br or I.

The number of repeating units n, m, x and y can have values that are fractions. The ranges of the numbers are: n+m from about 80-95 mol % with the ratio of n:m being 1:10 to 10:1, preferably 1:2 to 2:1; x from about 5-15 mole %, preferably from about 8-12 mole %; y from about 1-5 mole %, preferably from about 2-3 mole %.

In an embodiment x is 9.7 mole %, y is 2.25 mole %, and n+m is 88 mole %.

Embodiment crosslinkable polymers are shown below:

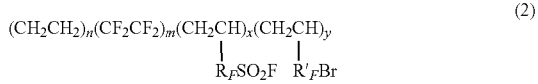

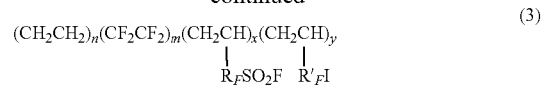

wherein $R_F$, $R'_F$, n, m, x and y are as described hereinabove.

Disclosed are crosslinkable polymers containing the repeating units $(CH_2CH_2)_n$, $(CF_2CF_2)_m$, $(CH_2C(R_FSO_2F)H)_x$, and $\{CH_2C(R'_FI)H\}_y$. Such crosslinkable polymers with chain ends terminated with Iodine (I) groups are shown below in formula (4):

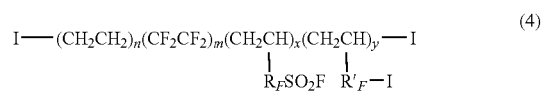

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms; and n, m, x and y are the number of repeating units of the monomers.

The crosslinkable polymers of formulae (1), (2) and (3) can be prepared via free-radical polymerization. A process to prepare a crosslinkable polymer comprises polymerizing monomers $CF_2=CFR_F-SO_2F$ and $CF_2=CFR'_F-X$ and monomers selected from TFE ($CF_2=CF_2$), $CH_2=CH_2$ and mixtures thereof with a free radical initiator; wherein $R_F$, $R'_F$ and X are as described hereinabove.

The crosslinkable polymer of formula (4) can be prepared via free-radical polymerization. A process to prepare a crosslinkable polymer comprises polymerizing monomers selected from the mixture of $CF_2=CFR_F-SO_2F$, TFE, $CH_2=CH_2$, $I-R'_F-I$ and fluorinated diene; with a free radical initiator; wherein $R_F$ and $R'_F$ are as described hereinabove. Suitable fluorinated dienes are disclosed in European Patent EP 1172382.

The fluorinated diene can crosslink during polymerization. The $I-R'_F-I$ monomer can chain transfer during polymerization so as to reduce and/or prevent the crosslinking reactions of the fluorinated diene. This allows the crosslinkable polymer to have I groups which can be post crosslinked.

Suitable optional monomers include but are not limited to hexafluoropropylene, perfluoro(methyl vinyl ether), perfluoro(propyl vinyl ether), methyl vinyl ether, chlorotrifluoroethylene, perfluoro(2,2-dimethyl-1,3-dioxole), and propylene. Any of these comonomers may be optionally substituted, such as substitution with one or more $SO_2F$ groups.

The polymerization of the monomers may be done neat in solution or organic suspension. The polymerization may be done in batch, semibatch or continuous operations. A free radical polymerization initiator is typically used, such as but not limited to peroxides such as perfluoro(propionyl peroxide) (3P), azonitriles such as azobis(isobutylronitrile) (AIBN), and redox initiators such as persulfate-bisulfite. In the case of dispersion polymerizations a surfactant can also be used, typically a partially fluorinated or perfluorinated surfactant. The surfactant can be anionic, cationic, or nonionic. Suitable surfactants include, are not limited to alkyl benzene sulfonates, and fluorinated surfactants such as C8 (ammonium perfluorooctanoate) Zonyl® fluorosurfactants such as Zonyl® 62, Zonyl® TBS, Zonyl® FSP, Zonyl® FS-62, Zonyl® FSA, Zonyl® FSH, and fluorinated alkyl ammonium salts such as but not limited to $R'_w NH_{(4-w)} X$ wherein X is $Cl^-$, $Br^-$, $I^-$, $F^-$, $HSO_4^-$, or $H_2PO_4^-$, where w=0-4, where R' is ($R_F CH_2 CH_2$). Zonyl® fluorosurfactants are available from E. I. DuPont de Nemours, Wilmington, Del., and in general are anionic, cationic, amphoteric or nonionic oligomeric hydrocarbons containing ether linkages and fluorinated substituents.

The polymerizations can be performed at any temperature at which the reaction proceeds at a reasonable rate and does not lead to degradation of the product or catalyst. The process is generally run at a temperature at which the selected initiator generates free radicals. The reaction time is dependent upon the reaction temperature, the amount of catalyst and the concentration of the reactants, and is usually about 1 hour to about 100 hours.

A preferred process is solution polymerization using fluorocarbon solvents. Suitable solvents used include but not limited to fluorocarbons, chlorofluorocarbons, fluoroethers, and perfluorocarbons. Solvents and free radical initiators suitable for polymerization of fluorinated monomers are described in U.S. Pat. No. 3,282,875 to E. I. du Pont de Nemours and Company, Wilmington Del.

The polymers can be recovered according to conventional techniques including filtration and precipitation using a nonsolvent. The recovered polymers can be dissolved or dispersed in a suitable solvent for further processing.

Crosslinking of the polymers can be done by heating the polymer in the membrane form or in the powered form with a free radical initiator and a coagent triene. It is suitable to have a coagent along with the free radical initiator to obtain effective crosslinking. A preferred free radical initiator is Luperox 101XL (available form Arkema Corporation, PA). Suitable triene coagents include non-conjugated trienes, such as 2,3-diisopropylidene-5-norbornene, 2-ethylidene-3-isopropylidene-5-norbornene, 2-propenyl-2,2-norbornadiene, 4-ethylidene-8-methyl-1,7-nonadiene and 4,8-dimethyl-1,4,8-decatriene, 8-methyl-4-ethylidene-1,7-octadiene; triallyl triones such triallyl-1,3,5-triazine-2,4,6-(1H,3H,5H) trione; and triallyl aromatic compounds such as triallyl isocyanurate. Mixtures of the trienes can also be used. A preferred triene is triallyl-1,3,5-triazine-2,4,6-(1H,3H,5H) trione (TAIC).

Optionally crosslinking of the polymers can be initiated by exposing the membranes formed of the crosslinkable polymer to radiation. A suitable crosslinking method comprises exposing the crosslinkable polymer to radiation, such as but not limited to ultraviolet radiation, gamma ray radiation, electron beam radiation and heavy ion radiation to generate crosslinks. Any suitable apparatus can be used. Typically electron beam radiation is used at a dosage of 10-100 kGy.

Hydrolysis of the crosslinked polymers obtained by crosslinking of the crosslinkable polymers of formulae (1)-(4) can be with alkali metal bases such as KOH, NaOH, LiOH or alkali metal carbonates such as $Na_2CO_3$, $Li_2CO_3$, $K_2CO_3$ in solvents such as methanol, DMSO and water. The hydrolysis step is usually carried out at room temperature to 100° C., preferably at room temperature to 50° C. After the hydrolysis step, $R_F SO_3 M$ groups are formed by the hydrolysis of $R_F SO_2 F$ groups in crosslinked polymers of formulae (1), (2), (3) and (4), where M is independently H, an alkali cation, ammonium or substituted ammonium groups. M can be a single cation or a mixture of different cations selected from the group consisting of Cs, K, Na, and Li. Typically the hydrolysis step is performed after the crosslinkable polymer is crosslinked to form a proton conductive membrane. The crosslinking and the hydrolysis may be done simultaneously.

The polymers described herein can be formed into proton conductive membranes using any conventional method such as but not limited to solution or dispersion film casting or extrusion techniques. The membrane thickness can be varied as desired for a particular application. Typically, for electrochemical uses, the membrane thickness is less than about 350 µm, more typically in the range of about 15 µm to about 175 µm. If desired, the membrane can be a laminate of two polymers such as two polymers having different equivalent weight. Such films can be made by laminating two membranes. Alternatively, one or both of the laminate components can be cast from solution or dispersion. When the membrane is a laminate, the chemical identities of the monomer units in the additional polymer can independently be the same as or different from the identities of the analogous monomer units of the first polymer.

The membrane may optionally include a porous support or reinforcement for the purposes of improving mechanical properties, for decreasing cost and/or other reasons. For resistance to thermal and chemical degradation, the support typically is made from a fluoropolymer, more typically a perfluoropolymer. For example, the perfluoropolymer of the porous support can be a microporous film of polytetrafluoroethylene (PTFE) or a copolymer of tetrafluoroethylene. Microporous PTFE films and sheeting are known that are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids. Impregnation of expanded PTFE (ePTFE) with perfluorinated sulfonic acid polymer is disclosed in U.S. Pat. Nos. 5,547,551 and 6,110,333. ePTFE is available under the trade name "Goretex" from W. L. Gore and Associates, Inc., Elkton, Md., and under the trade name "Tetratex" from Tetratec, Feasterville, Pa. The crosslinking of the membrane can be performed after the porous support is impregnated with the crosslinkable polymer. One of ordinary skill in the art will understand that membranes prepared from the dispersions may have utility in packaging, in non-electrochemical membrane applications, as an adhesive or other functional layer in a multi-layer film or sheet structure, and other classic applications for polymer films and sheets that are outside the field of electrochemistry.

Membrane electrode assemblies (MEA) and fuel cells therefrom are well known in the art and can comprise any of the proton conductive membranes described above. One suitable embodiment is described herein. A proton conductive membrane is used to form a MEA by combining it with a catalyst layer, comprising a catalyst such as platinum, which is unsupported or supported on carbon particles, a binder such as Nafion®, and a gas diffusion backing. The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer, or a mixture of such polymers. The binder polymer is typically ionomeric and can be the same ionomer as in the membrane. A fuel cell is constructed from a single MEA or multiple MEAs stacked in series by further providing porous and electrically conductive anode and cathode gas diffusion backings, gaskets for sealing the edge of the MEA(s), which also provide an electrically insulating layer, graphite current collector blocks with flow fields for gas distribution, aluminum end blocks with tie rods to hold the fuel cell together, an anode inlet and outlet for fuel such as hydrogen or methanol, and a cathode gas inlet and outlet for oxidant such as air.

The in-plane conductivity of proton conductive membranes can be measured under conditions of controlled relative humidity and temperature by a technique in which the current flows parallel to the plane of the membrane. A four-electrode technique can used similar to that described in an article entitled "Proton Conductivity of Nafion® 117 As Measured by a Four-Electrode AC Impedance Method" by Y. Sone et al., J. Electrochem. Soc. 143, 1254 (1996) that is herein incorporated by reference. A lower fixture can be machined from annealed glass-fiber reinforced Poly Ether Ether Ketone (PEEK) to have four parallel ridges containing grooves that supported and held four 0.25 mm diameter platinum wire electrodes. The distance between the two outer electrodes can be 25 mm, while the distance between the two inner electrodes can be 10 mm. A strip of proton conductive membrane can be cut to a width between 10 and 15 mm and a length sufficient to cover and extend slightly beyond the outer electrodes, and placed on top of the platinum electrodes. An upper fixture which has ridges corresponding in position to those of the bottom fixture, can be placed on top and the two fixtures were clamped together so as to push the proton conductive membrane into contact with the platinum electrodes. The fixture containing the membrane can be placed inside a small pressure vessel (pressure filter housing), which can be placed inside a forced-convection thermostated oven for heating. The temperature within the vessel can be measured by means of a thermocouple. Water can be fed from a calibrated Waters 515 HPLC pump (Waters Corporation, Milford, Mass.) and combined with dry air fed from a calibrated mass flow controller (200 sccm maximum) to evaporate the water within a coil of 1.6 mm diameter stainless steel tubing inside the oven. The resulting humidified air can be fed into the inlet of the pressure vessel. The total pressure within the vessel (100 to 345 kPa) can be adjusted by means of a pressure-control letdown valve on the outlet and measured using a capacitance manometer (Model 280E, Setra Systems, Inc., Boxborough, Mass.). The relative humidity can be calculated assuming ideal gas behavior using tables of the vapor pressure of liquid water as a function of temperature, the gas composition from the two flow rates, the vessel temperature, and the total pressure. The slots in the lower and upper parts of the fixture allowed access of humidified air to the membrane for rapid equilibration with water vapor. Current can be applied between the outer two electrodes while the resultant voltage can be measured between the inner two electrodes. The real part of the AC impedance (resistance) between the inner two electrodes, R, can be measured at a frequency of 1 kHz using a potentiostat/frequency response analyzer (PC4/750™ with EIS software, Gamry Instruments, Warminster, Pa.). The conductivity, κ, of the membrane can be then calculated as κ=1.00 cm/($R \times t \times w$), where t is the thickness of the membrane and w is its width (both in cm).

EXAMPLE 1

Polymerization of TFE+Ethylene+
$CH_2$=$CHCF_2CF_2OCF_2SO_2F$+$CH_2$=$CHCF_2CF_2Br$ In a stainless steel pressure vessel the following materials were added: 10 g of $CH_2$=$CHCF_2CF_2OCF_2SO_2F$, 2 g of $CH_2$=$CHCF_2CF_2Br$, 0.6 g of Lupersol 11 (Pennwalt Corporation, Pennsylvania) in 100 ml of F113 (1,1,2-trichloro-1,2,2-trifluoroethane). The vessel was then sealed, cooled, and purged three times with nitrogen. Next, 22 g of TFE and 7 g of ethylene was added to the vessel. The vessel was slowly heated to 60° C. and kept at that temperature for 10 hours. After cooling, the resulting polymer mixture was washed with methanol, filtered and dried to give 28.7 g of polymer. Analysis: C 34.32%, H 2.90%, Br 1.86%, F 51.84%, and S 3.17%.

EXAMPLE 2

Preparation of $ICF_2CF_2CF_2I$ 800 g of HFPO (hexafluoropropylene oxide) was charged into a stainless steel pressure vessel and heated at 190° C. for 10 hours. The resulting gas was transferred into a reactor and was mixed with 300 g of iodine. After cooling, liquid $ICF_2CF_2CF_2I$ was obtained.

EXAMPLE 3

In a stainless steel pressure vessel the following materials were added: 10 g of $CH_2$=$CHCF_2CF_2OCF_2SO_2F$, 3 g of $I(CF_2)_6I$, and 0.35 g of initiator (Percadox 16N) in 150 ml of F113 (1,1,2-trichloro-1,2,2-trifluoroethane). The vessel was then sealed, cooled, and purged three times with nitrogen. Next, 22 g of TFE and 7 g of ethylene was added. The vessel was slowly heated to 60° C. and kept at that temperature for 10 hours. After cooling, the resulting polymer mixture was washed with methanol, filtered and dried at 110° C. under vacuum. 23.25 g of polymer was obtained.

EXAMPLE 4

Crosslinking of Polymer and Hydrolysis

Example 4A 5.0 g of polymer from Example 1 was ground into a fine polymer in a freezer mill under liquid nitrogen. 0.1 g of Luperox 101XL (Arkema corp.) and 0.1 g of TAIC (triallyl-1,3,5-triazine-2,4,6-(1H,3H,5H) trione) were added to the polymer and mixed well by shaking, resulting in a fine powder. The powder was pressed into a film between two sheets of Teflon® using a 6.5 mil aluminum form. The film was then heated to 115° C. and 4500-5000 psig is applied for 2 minutes followed by cooling to 80° C. The film is flexible and opaque. After two weeks, the film was further processed by reheating to 180° C. and then pressing at 22,500 psig for 20 minutes. After cooling the film remained flexible and opaque.

A portion of the film was hydrolyzed by soaking at 50° C. overnight in 12% $K_2CO_3$ (1:1 water:methanol) solution. The film was washed and treated with 10% $HNO_3$ for 2 hours at room temperature and then for 1½ hours at 50° C. The film was subsequently washed to a neutral pH with water.

Example 4B

The polymer from Example 1 was crosslinked by mixing 2.2 g of the polymer with 0.7 g of Luperox 101XL (Arkema Corporation, Philadelphia, Pa.) and 0.8 g of TAIC (triallyl-1,3,5-triazine-2,4,6-(1H,3H,5H) in 1.0 g of 2,4-Dichloro(trifluoromethyl)benzene in a flask, and heating the mixture to 100° C.

Example 4C

A portion of the film from Example 4A was hydrolyzed by soaking in 10% $(NH_4)_2CO_3$ (methanol:water 4:6 wt:vol) at 50° C. for four hours, then washed with water. Next the film was treated with 10% $HNO_3$ at 60° C. overnight, and then washed to neutral pH with water. The resulting film was stiff with no swelling. The film was then retreated with 10% $(NH_4)_2CO_3$ at 50° C. for 48 hours, and washed with acid and water as above.

EXAMPLE 5

A film was prepared from the polymer of Example 1 by heating the polymer at 220-250° C. and subjecting it to a pressure of 30,000 psi. The film was immersed in a 10% KOH in DMSO/methanol/water (10/40/50 by volume) at 60° C. for 6 hours and then kept at room temperature overnight. The film was then washed with water and further treated with 10% HNO3 at 60° C. for 2 hours. After washing again with water, the film was heated in distilled water for 2 hours at 80° C. Conductivity of the resulting film was 0.08035 S/cm.

What is claimed is:

1. A crosslinkable polymer having repeating units as shown in the following formula:

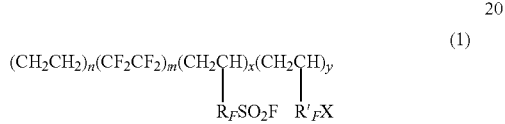

(1)

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms;

n, m, x and y are the number of repeating units of the monomers; and wherein n+m is from about 80-95 mole %, x is from about 5-15 mole % and y is from about 1-5 mole %, and X is Br or I.

2. The crosslinkable polymer of claim 1 wherein X is Br.

3. The crosslinkable polymer of claim 1 wherein X is I.

4. The polymer of claim 1 further comprising one or more repeating units derived from a comonomer selected from the group consisting of optionally substituted hexafluoropropylene, perfluoro(methyl vinyl ether), perfluoro(propyl vinyl ether), methyl vinyl ether, chlorotrifluoroethylene, perfluoro (2,2-dimethyl-1,3-dioxole) and propylene.

5. A crosslinked polymer formed by reaction of the X groups of the crosslinkable polymer of claim 1 in the presence of a coagent comprised of a triene and a free radical initiator.

6. A proton conductive membrane formed from the crosslinked polymer formed by the crosslinkable polymer of formula (1) of claim 1; wherein the $R_F SO_2 F$ groups have been converted by hydrolysis to $R_F SO_3 M$ groups, and wherein M is independently H, an alkali cation, ammonium or substituted ammonium groups.

7. An electrochemical cell comprising the proton conductive membrane of claim 6.

8. The electrochemical cell of claim 7 that is a fuel cell.

9. A crosslinkable polymer having repeating units as shown in the following formula:

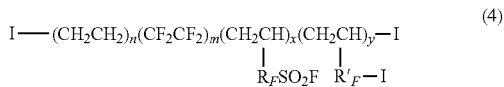

(4)

wherein $R_F$ is linear or branched perfluoroalkyl group of 1 to 20 carbon atoms, optionally containing oxygen or chlorine;

$R'_F$ is linear or branched perfluoroalkyl group of 1 to 20 carbon atoms; n, m, x and y are the number of repeating units of the monomers; and wherein n+m is from about 80-95 mole %, x is from about 5-15 mole % and y is from about 1-5 mole.

10. A crosslinked polymer formed by reaction of the I groups of the crosslinkable polymer of claim 9 in the presence of a coagent comprised of a triene and a free radical initiator.

11. A proton conductive membrane formed from the crosslinked polymer formed by the crosslinkable polymer of formula (4) of claim 9; wherein the $R_F SO_2 F$ groups have been converted by hydrolysis to $R_F SO_3 M$ groups, and wherein M is independently H, an alkali cation, ammonium or substituted ammonium groups.

* * * * *